(12) United States Patent
Camp, Jr.

(10) Patent No.: US 8,023,996 B2
(45) Date of Patent: Sep. 20, 2011

(54) CELLULAR TERMINALS AND OTHER ELECTRONIC DEVICES AND METHODS THAT ADJUST PROJECTED VIDEO IMAGES TO COMPENSATE FOR COLOR, BRIGHTNESS, AND/OR PATTERN OF A DISPLAY SURFACE

(75) Inventor: William O. Camp, Jr., Chapel Hill, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1047 days.

(21) Appl. No.: 11/851,578

(22) Filed: Sep. 7, 2007

(65) Prior Publication Data

US 2009/0066857 A1 Mar. 12, 2009

(51) Int. Cl.
*H04M 1/00* (2006.01)
*H04N 7/14* (2006.01)
*G09G 5/02* (2006.01)

(52) U.S. Cl. ............... 455/556.1; 455/575.1; 348/14.01; 345/589

(58) Field of Classification Search ............... 455/556.1, 455/575.1; 345/589, 600; 348/14.01–14.16, 348/744–747, 782
See application file for complete search history.

(56) References Cited

U.S. PATENT DOCUMENTS

| 5,371,537 A | 12/1994 | Bohan et al. |
| 6,489,934 B1 | 12/2002 | Klausner |
| 6,527,395 B1 | 3/2003 | Raskar et al. |
| 6,618,076 B1 * | 9/2003 | Sukthankar et al. .......... 348/180 |
| 7,133,133 B2 | 11/2006 | Merle et al. |
| 7,632,185 B2 * | 12/2009 | Solomon et al. ............... 463/34 |
| 2002/0105623 A1 * | 8/2002 | Pinhanez ........................ 353/69 |
| 2008/0024738 A1 * | 1/2008 | Nozaki et al. ................. 353/101 |
| 2008/0043205 A1 * | 2/2008 | Lonn .............................. 353/69 |

* cited by examiner

*Primary Examiner* — George Eng
*Assistant Examiner* — Wesley Kim
(74) *Attorney, Agent, or Firm* — Myers Bigel Sibley & Sajovec, P.A.

(57) ABSTRACT

Some electronic devices project video images onto a display surface that is external to the electronic device, and adjust the projected images to compensate for brightness and/or color of the display surface. An electronic device can include a video generator, a video projector, a camera, a calibration controller. The video generator can generate a video signal, and the video projector can project a video image in response to the video signal onto a display surface that is external to the electronic device to cause reflection of the video image. The camera can sense the reflected video image from the display surface. The calibration controller can adjust brightness and/or color of a subsequent video image that is projected by the video projector to compensate for differences between the video signal and the reflected video image sensed by the camera.

18 Claims, 6 Drawing Sheets

CELLULAR TERMINALS AND OTHER ELECTRONIC DEVICES AND METHODS THAT ADJUST PROJECTED VIDEO IMAGES TO COMPENSATE FOR COLOR, BRIGHTNESS, AND/OR PATTERN OF A DISPLAY SURFACE

FIELD OF THE INVENTION

The present invention relates to electronic devices with video projectors, and, more particularly, to controlling video projectors in cellular terminals and other electronic devices.

BACKGROUND OF THE INVENTION

Cellular mobile communication terminals now enable mobile voice and video communications to be carried out practically anywhere. As communication terminals have become smaller and lighter, they have become even more convenient to carry on one's person. While the compactness of a communication terminal is advantageous for portability when used for ordinary voice communication, it can be a disadvantage when the communication terminal is used to display video, such as video that is generated at the communication terminal or is received from another communication terminal or video server. Mobile communication terminals inherently have a relatively small display which may be too small and/or have insufficient resolution to provide acceptable display video to one person and, much less likely, acceptable display to a group of persons. In view of the difficulty to adequately display video on such built-in displays, some communication terminals have been proposed that would include a video projector that would project video onto an external display surface, such as a wall of a room. Projecting the video onto an external display surface would enable the video to be viewed in a much larger format than could be provided by a built-in display.

SUMMARY OF THE INVENTION

Various embodiments of the present invention are directed to electronic devices and methods that project video images onto a display surface that is external to the electronic device, and adjust subsequently projected video images so as to compensate for brightness and/or color of the display surface.

In some embodiments, an electronic device includes a video generator, a video projector, a camera, a calibration controller. The video generator can generate a video signal. The video projector can project a video image in response to the video signal onto a display surface that is external to the electronic device to cause reflection of the video image. The camera can sense the reflected video image from the display surface. The calibration controller can adjust brightness and/or color of a subsequent video image that is projected by the video projector to compensate for differences between the video signal and the reflected video image sensed by the camera.

In some further embodiments, the calibration controller causes the video projector to sequentially project a plurality of defined calibration color video images on the display surface while the camera senses the reflected video images, and adjusts color of a subsequent video image that is projected by the video projector to compensate for the identified color of the display surface.

In some further embodiments, the calibration controller identifies brightness and/or color of an adjacent surrounding area of the display surface outside an area of the display surface that is reflecting the video image, and regulates The video generator and/or the video projector to adjust brightness and/or color of at least a peripheral portion of a subsequently projected video image in response to the identified brightness and/or color of the adjacent surrounding area of the display surface. For example, the calibration controller may decrease/increase brightness of at least the peripheral portion of the subsequently projected video image in response to sensing at least a threshold darkness in the adjacent surrounding area of the display surface.

In some further embodiments, the calibration controller identifies a pattern on the display surface in response to the reflected video image sensed by the camera, and regulates the video generator and/or the video projector to adjust groups of pixels in a subsequently projected video image so as to at least partially reduce the presence of the display surface pattern in the reflected video image.

Other electronic devices and/or methods according to embodiments of the invention will be or become apparent to one with skill in the art upon review of the following drawings and detailed description. It is intended that all such additional electronic devices and methods be included within this description, be within the scope of the present invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiments of the invention. In the drawings.

DETAILED DESCRIPTION OF EMBODIMENTS OF THE INVENTION

Figure 1A:
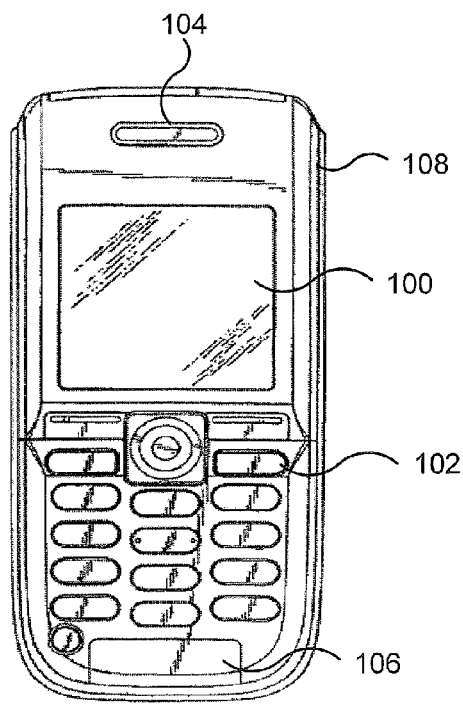
FIGS. 1A and 1B illustrate a front and back view of an electronic device that is configured as a cellular mobile communication terminal and operates according to some embodiments of the present invention.

The present invention will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

Some embodiments are described with regard to flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

For purposes of illustration and explanation only, various embodiments of the present invention are described herein in the context of cellular mobile communication terminals ("mobile terminals"). It will be understood, however, that the present invention is not limited to such embodiments and may be embodied generally in any electronic device that includes a video generator that generates a video signal, a video projector that projects a video image responsive to the video signal onto a display surface that is external to the electronic device, a camera that senses the video image reflected by the display surface, and a calibration controller that operates in accordance with at least one embodiment described herein.

Figure 1B:
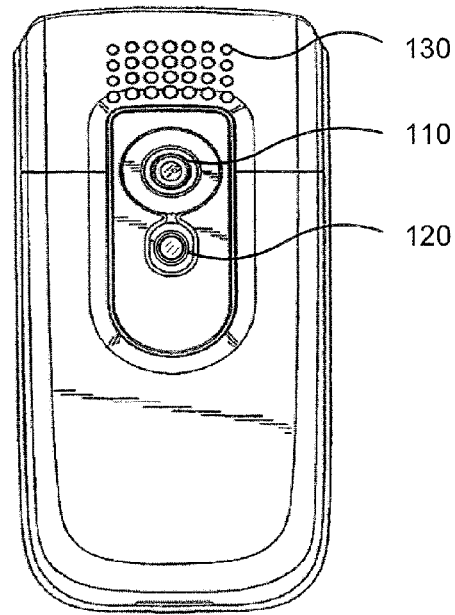

FIGS. 1A and 1B respectively illustrate front and back views of an electronic device that is configured as a cellular mobile communication terminal and operates according to some embodiments of the present invention. Referring to the front view shown in FIG. 1A, the mobile terminal may include a display 100, a user interface 102 (e.g., keypad), speaker 104, and a microphone 106, and each of which are at least partially disposed within a housing 108. Referring to the back view shown in FIG. 1B, the mobile terminal further includes a projector 110 and a camera 120, and may further include a larger loudspeaker 130.

Figure 2:
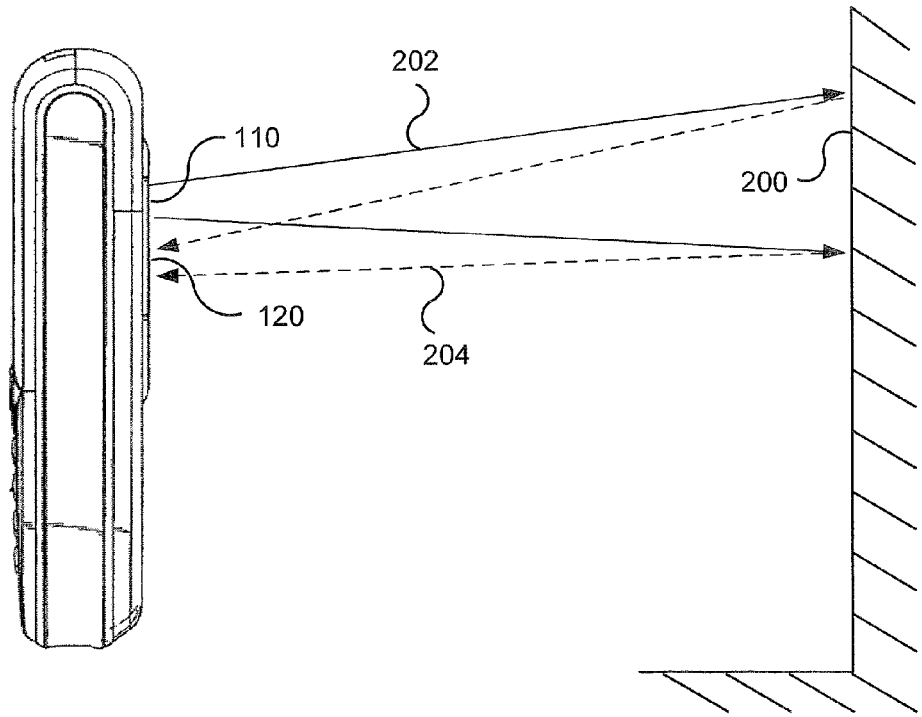
FIG. 2 illustrates a side view of the mobile terminal of FIGS. 1A-B when the mobile terminal is operating in accordance with some embodiments of the present invention.

FIG. 2 illustrates a side view of the mobile terminal of FIGS. 1A-B when the projector 110 is projecting a video image 202 onto a display surface 200, and the camera 120 is sensing the video image reflected 204 by the display surface 200.

Some embodiments of the present invention may arise from a realization that when video projectors are incorporated into mobile electronic devices, such as cellular mobile terminals, users thereof are likely to project video images onto substantially diverse types of display surfaces, such as walls, doors, ceilings, and floors. While some of these display surfaces may provide a reflective white surface that approximates a typical projector display screen, is more likely that many of these display services will have colors, textured surfaces, and/or patterns that may not only affect the brightness and color of the reflected image, but may also introduce visual patterns into the reflected image, thereby detracting from the user's perceived quality of the reflected image. Moreover, the inherent mobility of these electronic devices may result in the video images being projected onto various different display surfaces over a relatively brief time, such as due to unsteady hand movements by a user holding the electronic device and/or movement, such as walking, by such user. Accordingly, the colors, texture, and/or patterns of the various display surfaces may rapidly change, which may further affect and detract from the perceived quality of the reflected image.

Still some further embodiments of the present invention may arise from a realization that projectors that are incorporated into small size battery-powered mobile electronic devices (e.g., cellular mobile communication terminals) will likely project a much smaller video image onto a display surface than conventional projector systems, such as due to physical limitations on the size of the light source and projector optics and due to significantly limitations on the power that is available from the battery. When viewing a smaller video image on a display surface, the user's vision may combine with the viewed projector video image more of the characteristics of the color, texture, and/or pattern which are seen in the adjacent non-illuminated area of the display surface that surrounds the illuminated area, which may further detract from the perceived quality of the reflected image.

Figure 3A:
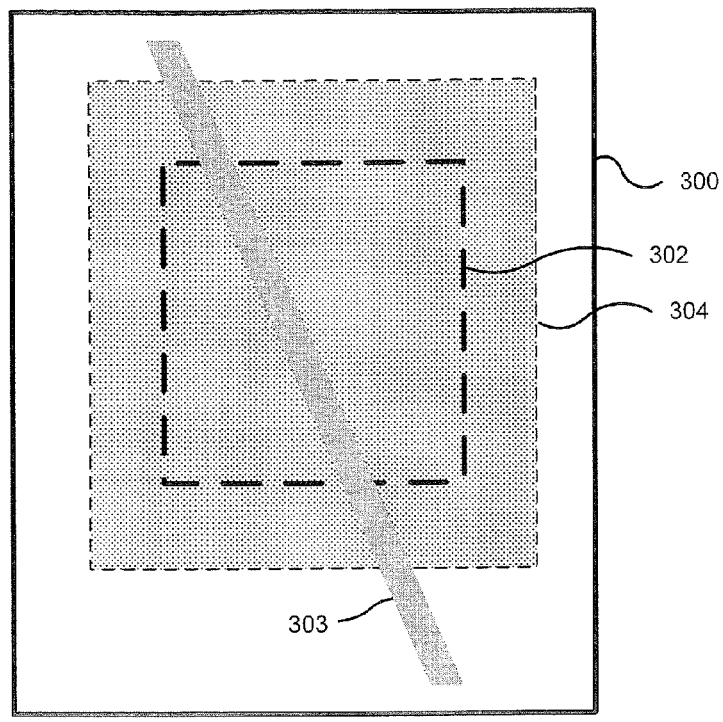
FIG. 3A illustrates various regions of a projection display surface in which color, brightness, and a pattern are sensed by a mobile terminal in accordance with some embodiments of the present invention.

An exemplary display surface 300 is shown in FIG. 3A with various regions thereof annotated to show where the video image may be projected, and where color, brightness, and a pattern 303, illustrated as an exemplary thick diagonal line for ease of illustration, on the display surface 300 can affect the video image that is reflected therefrom. Referring to FIG. 3A, a region of the display surface 300 where the mobile terminal will project the video image 202 is enclosed by the dashed line area 302, where the size of the projection area 302 may depend upon the distance between the projector 110 and the display surface 300. As described above, the color, texture, and pattern 303 in the projection area 302 can affect the brightness and color of the reflected video image 204 and can introduce the pattern 303 into the reflected video image 204, such that the reflected video image 204 may appear substantially different from the projected video image 202.

An adjacent surrounding area 304 is outside the projection area 302 and is not illuminated by the projector 110. However, as described above, the surrounding area 304 can be within the user's vision and its color, texture, and/or pattern characteristics can be visually combined by a user with the reflected video image 204, and which may further detract from the perceived quality of the viewed reflected video image 204.

According to some embodiments, the mobile terminal senses the color, brightness, and/or pattern characteristics of the display surface, and adjusts a projected video image to reduce the presence of the display surface characteristics (e.g., neutralize their affect) in the reflected video image.

Figure 3B:
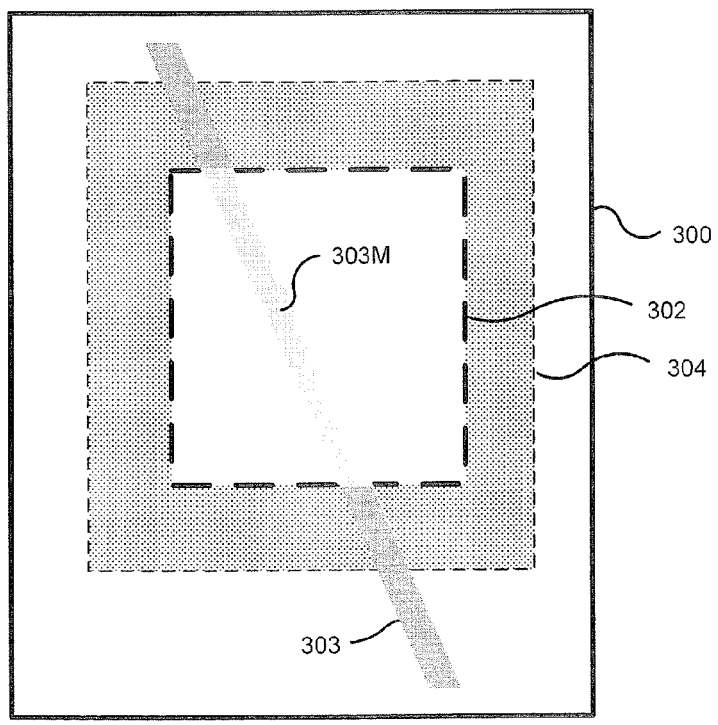
FIG. 3B illustrates various regions of a display surface in which the sensed color, brightness, and pattern on the projection display surface of FIG. 3A are compensated for in a video image that is projected from the mobile terminal in accordance with some embodiments of the present invention.

FIG. 3B illustrates the various areas of the display surface 300 after the mobile terminal has sensed the color, brightness, and pattern 303 characteristics of the projection area 302 and of the surrounding area 304, and has compensated the projected video signal to reduce the presence of the display surface 300 characteristics. Referring to FIG. 3B, the mobile terminal senses the color, brightness, and the pattern 303 characteristics of the projection area 302 and of the surrounding area 304 by controlling the projector 110 to project at least one video image onto the projector area 302, while using the camera 120 to analyze the reflected video image(s). As will be described in further detail below, to sense these characteristics of the display surface 300, the projector 110 may sequentially project a plurality of defined calibration color images, such as by projecting a substantially white color image, a substantially red color image, a substantially green color image, and/or a substantially blue color image onto the display area 300 while using the camera 122 to sense the reflected video images, and sensing the characteristics of the display surface 300 within the sensed video images. The mobile terminal adjusts a subsequently projected video image to compensate for the sensed characteristics of the display surface 300.

In the exemplary display surface illustration of FIG. 3B, the mobile terminal has adjusted a projected video image to compensate for the color, brightness, and pattern of the display area 302 and the surrounding area 304. For example, the brightness of the projected video image may be regulated to compensate for the sensed brightness of the display area 302, such as by increasing the brightness of the projected video image to increase the brightness of the display area 302 shown in FIG. 3B compared to the display area 302 shown in FIG. 3A. As a further example, the color of the projected video image can be biased so as to neutralize the affect of the color of the display area 302 and the surrounding area 304 on the reflected video image. The projected video image may be biased with a complementary color to that which is sensed within the display area 302 and/or within the surrounding area 304.

For example, when the sensed color of the display area 302 and/or the surrounding area 304 as the red components the projected video image may be biased with its complementary color green, when the sensed color has blue components the projected video image may be biased with its complementary color orange, and when the sensed color has yellow components the projected video image may be biased with its complementary color purple. As will be appreciated, other colors and/or combinations of colors may be introduced into the projected video image to compensate for the sensed characteristics of the display surface 300.

The mobile terminal has also adjusted groups of pixels in the projected video image to compensate for the sensed pattern 303 of the display surface 300. For example, groups of pixels within the video image that are projected onto the pattern 303 in the projection area 302 are adjusted to neutralize the effect of the pattern 303 on the reflected video image. The groups of pixels may be adjusted by biasing them with a complementary color to the color of the pattern 303 to make the pattern appear more bright and/or color neutral (e.g., white), as illustrated by the diminished presence of the modified pattern 303M, in the video image reflected from the projection area 302.

Accordingly, by adjusting the projected video image to compensate for the sensed characteristics of the display surface 300, the resulting display surface 300 may visually appear to be more color neutral and to have a more uniform brightness, and a user may perceive the resulting reflected video image 204 as being of higher quality.

Figure 4:
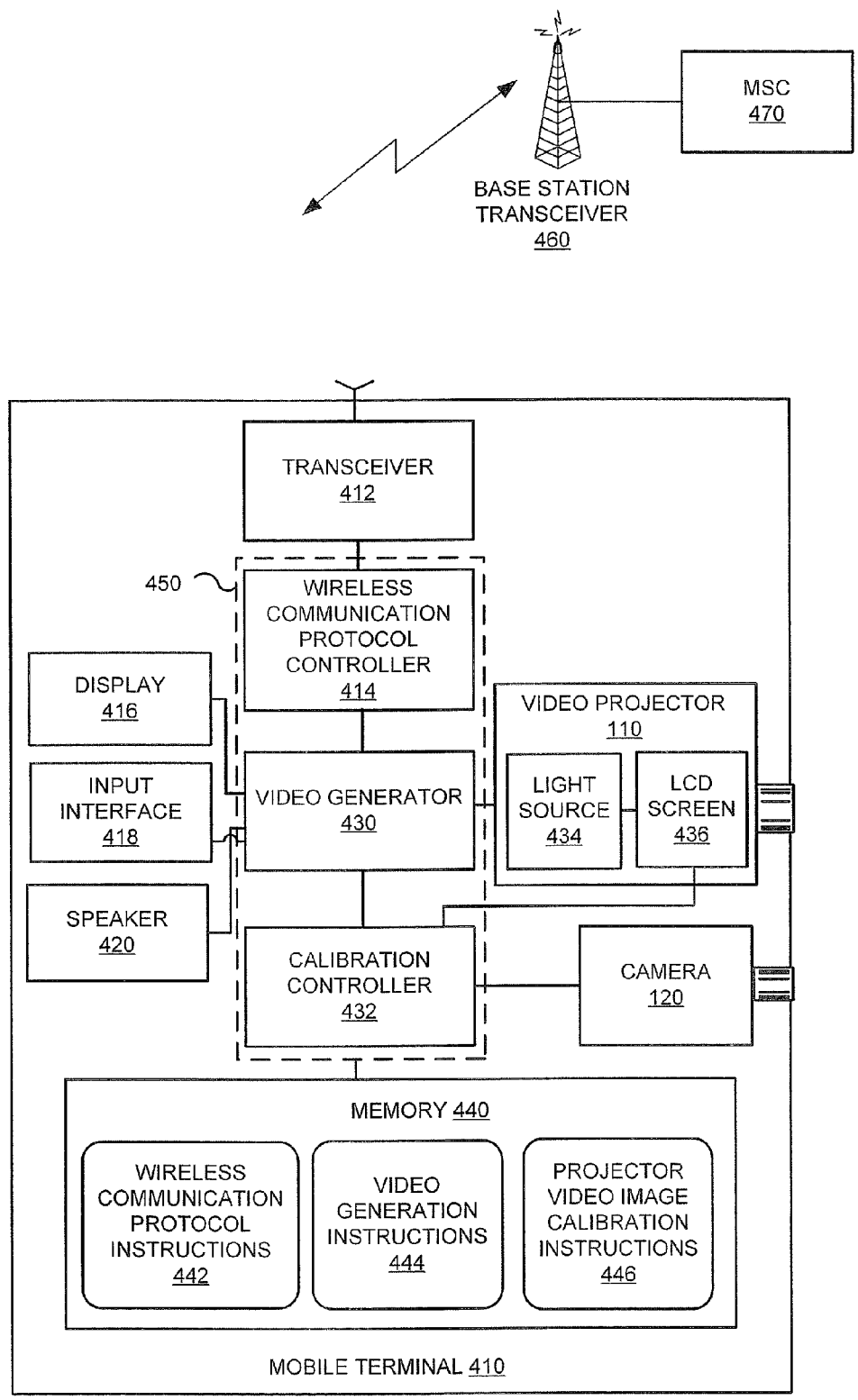
FIG. 4 is a schematic block diagram illustrating a mobile terminal and a cellular communication system in accordance with some embodiments of the present invention.

FIG. 4 is a schematic block diagram illustrating a mobile terminal 410 (e.g., a cellular mobile communication terminal), which may be configured as the mobile terminal shown in FIGS. 1A-1B and 2, and which communicates with a base station transceiver 460 connected to a mobile switching center ("MSC") 470 in accordance with some embodiments of the present invention.

The mobile terminal 410 includes a transceiver 412 in a wireless communication protocol controller ("protocol controller") 414 that are configured to communicate through a wireless air interface with the base station transceiver 460 and/or with other mobile terminals through, for example, an short range wireless network. The transceiver 412 typically includes a transmitter circuit and a receiver circuit which cooperate to transmit and receive radio frequency signals. The protocol controller 414 can be configured to encode/decode and control communications according to one or more cellular protocols, which may include, but are not limited to, Global Standard for Mobile (GSM) communication, General Packet Radio Service (GPRS), enhanced data rates for GSM evolution (EDGE), code division multiple access (CDMA), wideband-CDMA, CDMA2000, and/or Universal Mobile Telecommunications System (UMTS). The protocol controller 412 may alternatively or additionally encode/decode and control communications according to one or more short range communication protocols, which may include, but are not limited to Bluetooth and/or WiFi such as IEEE 802.11 (e.g., IEEE 802.11b-g).

The mobile terminal 410 can further include a display 416, a user input interface 418, and one or more speakers 420.

The mobile terminal 410 can be used to project movies and/or other video sources, such as video that is downloaded over the Internet and/or video that is received during a video conference call, and/or video that it may additionally or otherwise display on the display 416 onto an adjacent external display surface (e.g., 200 in FIG. 2 and 300 in FIGS. 3A-3B). The mobile terminal 410 is further configured to sense the color, brightness, and/or pattern characteristics of the external display surface and to adjust a projected video image to compensate for the sensed characteristics of the external display surface.

The mobile terminal 410 therefore includes a video generator 430, the video projector 110, the camera 120, and a calibration controller 432. The video projector 110 and/or the camera 120 may be configured as shown in FIGS. 1A-1B and 2, however they are not limited thereto may be configured in any manner that carries out at least one of the embodiments disclosed herein. The video generator 430 is configured to generate a video signal from video data stored in a memory 440 and/or video data that is received from the base station transceiver 460 and/or another mobile terminal through the transceiver 412 and the protocol controller 414. The video projector 110 is configured to project a video image onto an adjacent external display surface in response to the video signal. The video projector 110 may include a light source 434, such as a plurality of different primary color light emitting diodes (e.g., red, green, blue) and a liquid crystal display screen 436 that is modulated by the video signal from the video generator 430 to project a full-motion full-color video image therefrom. The camera 120 may include a conventional optical imaging sensor, such as a charge coupled sensor, and may have a fixed focus or a variable focus mechanism as is well known in the art.

The camera 120 and the calibration controller 432 form a feedback loop through which the color, brightness, and/or pattern characteristics of an adjacent external display surface are sensed, and a display surface characteristics are used to regulate the video generator 430 to cause a video image that is to be projected by the projector 110 to be adjusted so as to compensate for the display surface characteristics, such as was described above with regard to FIGS. 2 and 3A-3B and as will be further described below. The camera 120 is configured to sense color, brightness, and/or pattern characteristics of the display surface while the display surface is illuminated by a video image projected by the projector 110, while the display surface is illuminated by a separate light mechanism controlled by the calibration controller 432 (e.g., a light flash mechanism that may be included within the illustrated apparatus of the camera 120 or separate therefrom), and/or while the display surface is otherwise illuminated by ambient light (e.g., sunlight and/or ceiling lighting). The calibration controller 432 is configured to regulate the video generator 430 to facilitate sensing of the color, brightness, and/or pattern characteristics of the display surface, such as by causing the projector 110 to project a single calibration color image (e.g., projection of a substantially white color light) or to sequentially project a plurality of defined calibration color images onto the display surface while the camera 120 senses the display surface characteristics. The calibration controller 432 is further configured to adjust the video signal so as to cause a projected video image from the projector 110 to be compensated for the sensed characteristics of the external display surface.

Although the calibration controller 432 has been illustrated in FIG. 4 as regulating the video signal that is generated from the video generator 430 to adjust the projected video image, the calibration controller 432 is not limited thereto and may additionally or alternatively directly regulate the video projector 110 to adjust the projected video image. For example, the calibration controller 432 may control the LCD screen 436 to uniformly adjust the brightness and/or bias the color of the video image that is projected therethrough, and/or may adjust individual groups of pixels on the LCD screen 436 to adjust the projected image so as to compensate for pattern characteristics of the display surface and/or to otherwise non-uniformly adjust the projected image.

For example, the calibration controller 432 may control the video generator 430 and/or the projector 110 to cause a peripheral area of the projected video image (e.g., control groups of pixels corresponding to the peripheral area of the projected video image) to have a different brightness and/or color bias than a more central area of the projected video image, such as to compensate for color, brightness, and/or pattern that is sensed in the surrounding area (e.g., 304 in FIG. 3B) of the display surface outside the reflecting area (e.g., 302 in FIG. 3B) of the display surface. Accordingly, the calibration controller 432 may gradually increase/reduce the brightness of the projected video image, gradually increase/reduce color bias in the projected video image, and/or gradually increase/reduce the color contrast of the projected video image from the central region to the edge of the reflecting area (e.g., 302 in FIG. 3B), so as to compensate for relative darkness and/or color of the surrounding area (e.g., 304 in FIG. 3B).

By way of further example, the calibration controller 432 can regulate the video generator 430 and/or the projector 110 to selectively carry out one of decreasing and increasing brightness of at least a peripheral portion of a projected video image in response to sensing at least a threshold darkness in the adjacent surrounding area (e.g., 304 in FIG. 3B) of the display surface, and to selectively carry out the other one of decreasing and increasing brightness of at least the peripheral portion of the projected video image in response to sensing at least a threshold brightness in the adjacent surrounding area (e.g., 304 in FIG. 3B) of the display surface.

Although various functionality of the communication terminal 410 has been shown in FIG. 4 within separate blocks, it is to be understood that two or more of these functions may be combined in a single physical integrated circuit package and/or the functionality described for one or the blocks may be spread across two or more integrated circuit packages. For example, the functionally described herein for the protocol controller 414, the video generator 430, and the calibration controller 432 may be combined within instruction execution circuitry 450, such as a general purpose processor and/or a digital signal processor, that executes instructions within the memory 440. Accordingly, the memory 440 can include wirelessly communication protocol instructions 442, video generation instructions 444, and video image calibration instructions 446 that when executed by the instruction execution circuitry 450 carry out one or more of the embodiments described herein.

Figure 5:
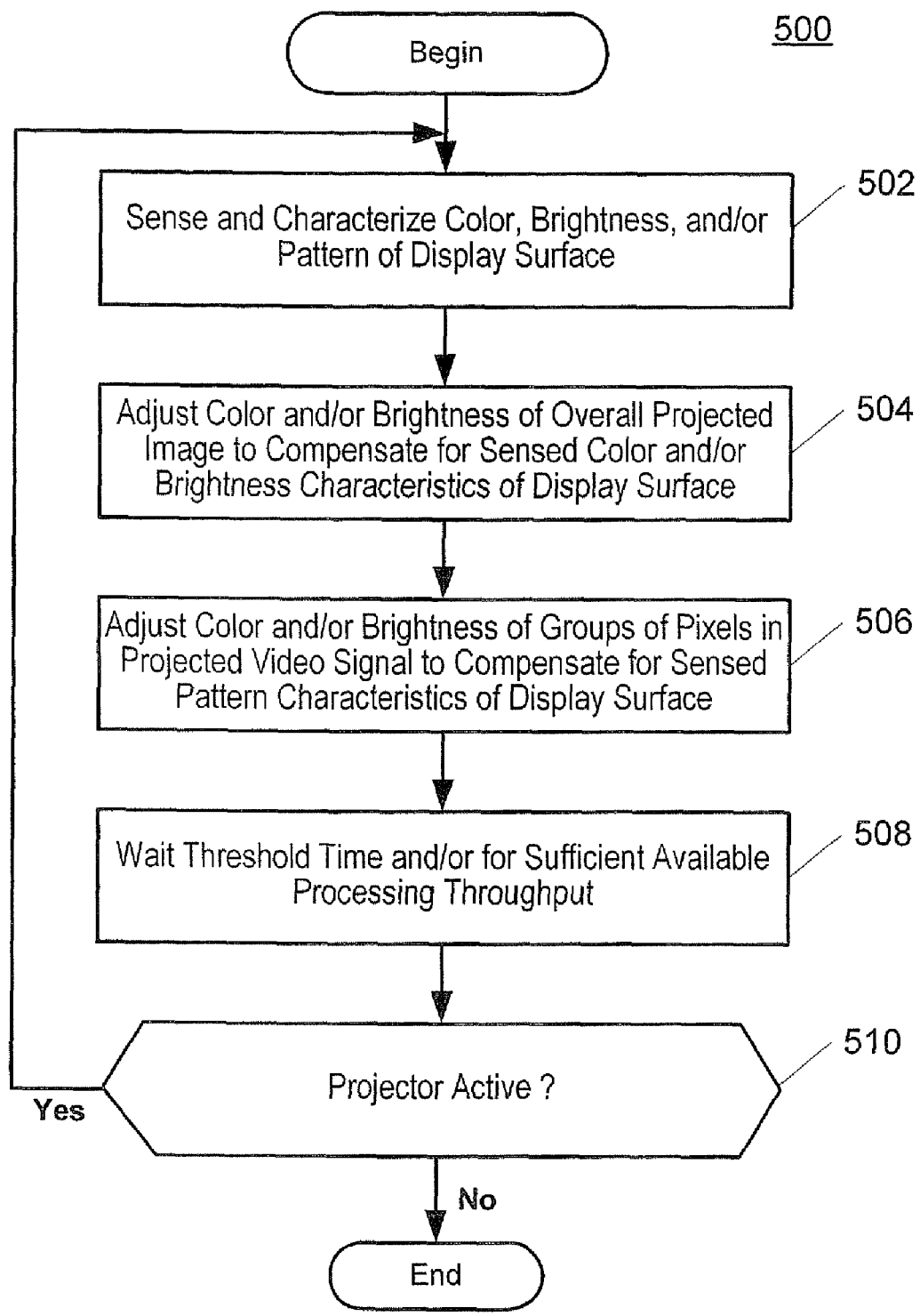
FIG. 5 is a flowchart that illustrates operations and methods for sensing color, brightness, and pattern characteristics of a display surface, and for compensating for the display surface characteristics in a projected video signal in accordance with some embodiments of the present invention.

FIG. 5 is a flowchart that illustrates operations and methods 500 that may be carried out by the camera 120, the calibration controller 432, the video generator 430, and the projector 110 to sense and compensate for color, brightness, and pattern of a display surface in a video image that is projected on the display surface in accordance with some embodiments of the present invention. Referring to FIG. 5, the camera 120 and calibration controller 432 cooperatively sense and characterize (block 502) the color, brightness, and/or pattern of a display surface. As described above, the display surface may be characterized by controlling the video generator 430 and/or the projector 110 project one or more calibration color images on the display surface, controlling another light source (e.g., a flash mechanism) to illuminate the display surface, and/or using ambient light. Various operations and methods for sensing display surface characteristics by projecting a plurality of calibration color images thereon will be described below with regard to FIG. 6.

Still referring to FIG. 5, the calibration controller 432 may regulate the video signal generated by the video generator 430 and/or may regulate the LCD screen 436 of the projector 110 to adjust (block 504) the color and/or brightness of the overall projected image in response to differences between the video signal and the reflected video image sensed by the camera 120, and, thereby, diminish the effect of the sensed display surface characteristics on the reflected video image. The calibration controller 432 may also regulate the video generator 430 and/or LCD screen 436 to adjust color and/or brightness of individual groups of pixels in the projected video image in response to differences between the corresponding areas represented in the video signal and the reflected video image sensed by the camera 120 to diminish the effect of a display surface pattern on the reflected video image. For example, groups of pixels in the projected video can be adjusted to provide variation in the brightness and in color bias of different areas of the projected video image. Accordingly, as described above, the color and/or brightness of individual groups of pixels can be adjusted to reduce the effects of a pattern on the display surface and/or affects of the surrounding non-illuminated area 304 of the display surface on the user's visual perception of the reflected video image from the display surface.

The operations and methods of blocks 502 and 504 to sense and compensate for display surface characteristics may be carried out as an initial calibration when a user or an application program activates the projector 110 to begin projecting a video image. The calibration controller 432 may cause a visual and/or audible instruction to be generated to a user (e.g., via the display 416 and/or the speaker 420) to move the mobile terminal 410 within a threshold calibration distance of the display surface which is less than a minimum focus distance of the video projector 110 but which is sufficiently close to enable more accurate determination of color of the display surface, and can identify color of the display surface by causing the projector 110 to project at least one defined calibration video image on the display surface while the camera 120 senses color of the display surface. Following identification of the color of the display surface, calibration controller 432 may cause a visual and/or audible instruction to be generated to the user to move the mobile terminal 410 within a focus range of the projector 110, so that a video image that is adjusted to compensate for the sensed display surface color can be properly projected onto the display surface.

Alternatively or additionally, the operations and methods of blocks 502 and 504 may be carried out periodically and/or continuously while the projector 110 projects a video image, so as to dynamically compensate for time during characteristics of the display surface, such as what may occur when the user is moving the mobile terminal while a video image is projected and/or when the ambient lighting on the display surface changes (e.g., a light is turned on/off in a room and/or sunlight is intermittently blocked by clouds).

For example, after the initial calibration, a subsequent, more continuous, calibration process may be carried out while the projector 110 is projecting a non-calibration video image stream by comparing the projected non-calibration video image stream to the reflected non-calibration video image stream, and modifying the non-calibration video image stream to reduce the differences between projected and reflected non-calibration video image streams. Moreover, if the differences between the projected and reflected non-calibration video image streams exceed one or more threshold values, projection of the non-calibration video image stream may be temporarily interrupted while the initial calibration process is repeated.

When the functionality the calibration controller 432, video generator 430, and the wireless communication protocol controller 414 are carried out within shared circuitry, such as within the instruction execution circuitry 450, the operation of the calibration controller 432 may undesirably interfere with wireless communications by the mobile terminal 410 and/or with the generation and projection of video therefrom. Accordingly, in some embodiments, the calibration instructions 446 in FIG. 4 that may perform the operations of blocks 502 and 504 can be carried out periodically after expiration of a threshold time and/or repetitively at a lower execution priority (block 508) than the wireless communication protocol instructions 442 in FIG. 4 and/or the video generation instructions 444 in FIG. 4, and may therefore be carried out when the instruction execution circuitry 450 has sufficient remaining processing throughput after satisfying the requirements of the video generator 430 and the protocol controller 414. When the projector is no longer active, and therefore not projecting a video image, the calibration operations and methods may be terminated (block 510).

Figure 6:
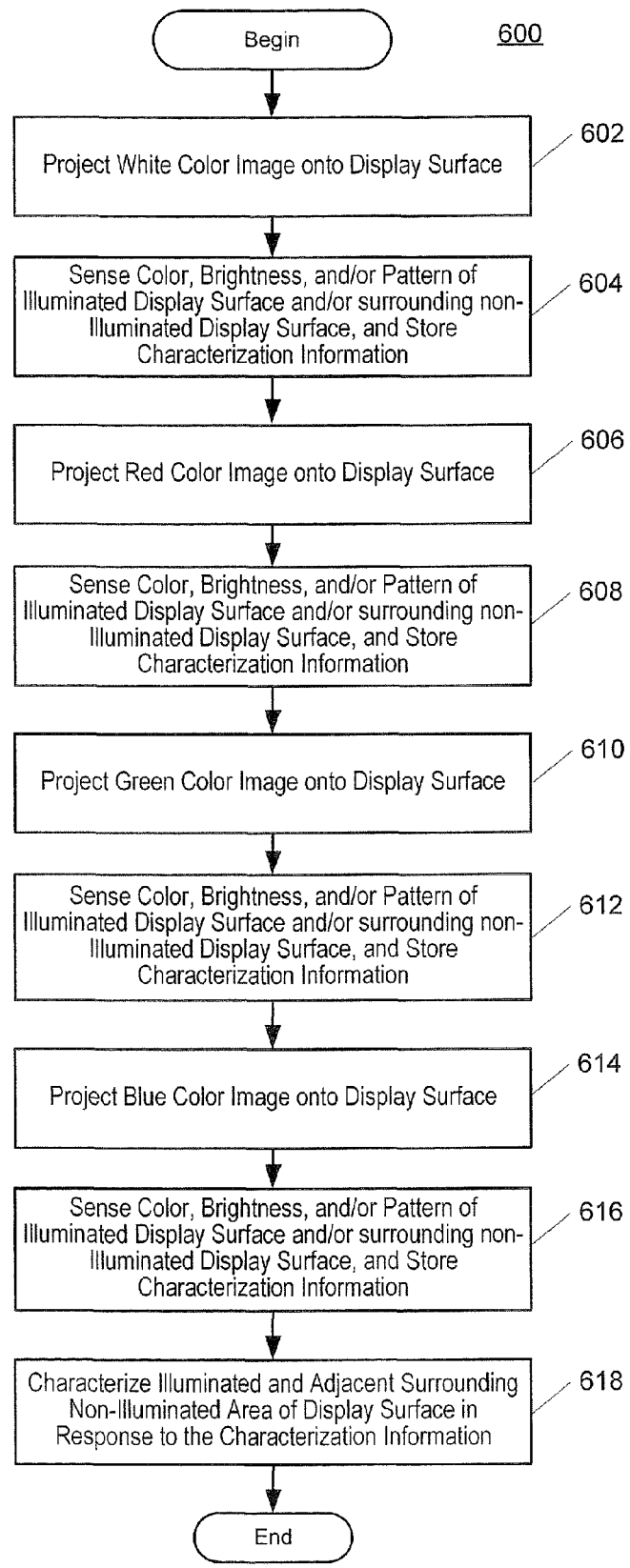
FIG. 6 is a flowchart that illustrates further operations and methods for sensing color, brightness, and pattern of a display surface in accordance with some embodiments of the present invention.

FIG. 6 is a flowchart that illustrates further operations and methods 600 for sensing and characterizing color, brightness, and pattern of a display surface in accordance with some embodiments of the present invention. In the exemplary embodiment shown in FIG. 6, the calibration controller 432 projects a plurality of calibration color video images, such as white, red, green, and blue video images, to characterize the color, brightness, and/or pattern on the display surface. However it is to be understood that the calibration controller 432 may use a single projected color, a plurality of two or more colors, and/or patterned combinations of colors to sense and characterize the color, brightness and/or pattern on the display surface.

Referring to FIG. 6, the calibration controller 432 controls the video generator 430 and/or the projector 110 to project (block 602) a substantially white color image onto a display surface while the camera 120 senses the color, brightness, and/or pattern of the illuminated area 302 and/or the adjacent non-illuminated surrounding area 304, and the calibration controller 432 generates and stores (e.g. in the memory 440) characterization information therefrom (block 604).

The calibration controller 432 may then control the video generator 430 and/or the projector 110 to project (block 606) a substantially red color image onto the display surface while the camera 120 senses the color, brightness, and/or pattern of the illuminated area 302 and/or the non-illuminated surrounding area 304, and the calibration controller 432 generates and stores (e.g. in the memory 440) characterization information therefrom (block 608).

The calibration controller 432 may then control the video generator 430 and/or the projector 110 to project (block 610) a substantially green color image onto the display surface while the camera 120 senses the color, brightness, and/or pattern of the illuminated area 302 and/or the non-illuminated surrounding area 304, and the calibration controller 432 generates and stores (e.g. in the memory 440) characterization information therefrom (block 612).

The calibration controller 432 may then control the video generator 430 and/or the projector 110 to project (block 614) a substantially blue color image onto the display surface while the camera 120 senses the color, brightness, and/or pattern of the illuminated area 302 and/or the non-illuminated surrounding area 304, and the calibration controller 432 generates and stores (e.g. in the memory 440) characterization information therefrom (block 616).

The calibration controller 432 then combines the characterization information generated in blocks 604, 608, 612, and 616 to characterize the illuminated area 302 and non-illuminated surrounding area 304 of the display surface. The calibration controller 432 may then regulate the video generator 430 and/or the video projector 110 to adjust the projected video image so as to diminish the effect of the display surface characteristics on the reflected video image and, relatedly, improve the user's perception of the video image, such as described above with regard to FIGS. 3B, 4, and 5.

Figure 7:
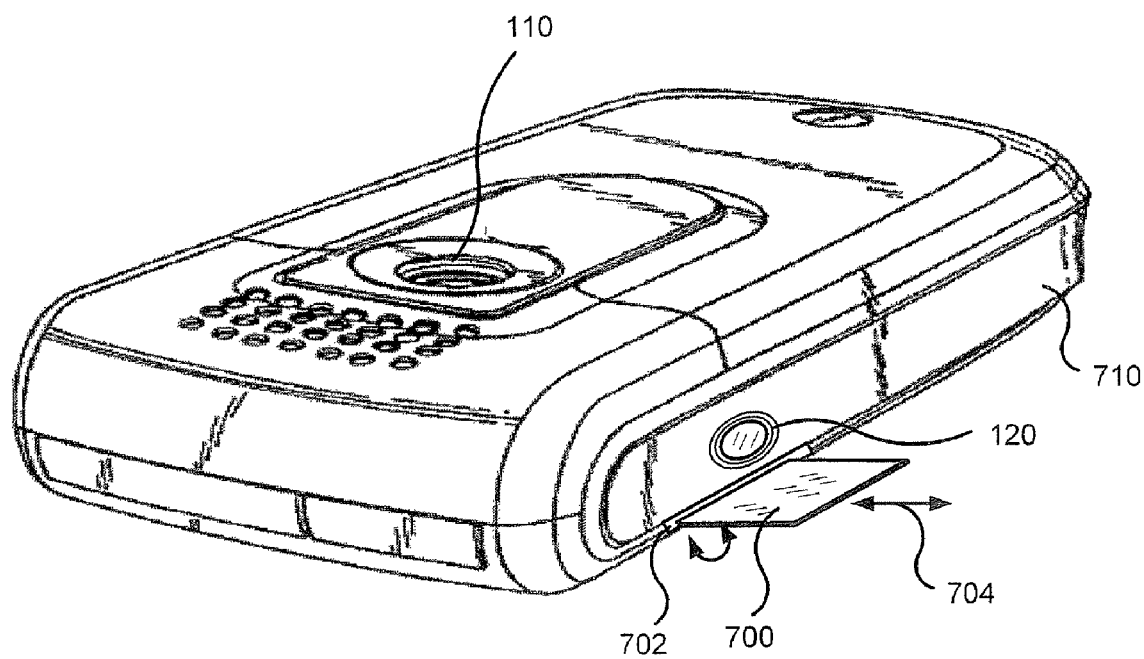
FIG. 7 illustrates an electronic device that is configured as a cellular mobile communication terminal in accordance with some more embodiments of the present invention.

FIG. 7 illustrates another embodiment of an electronic device that is configured as cellular mobile communication terminal in accordance with some more embodiments of the present invention. Referring to FIG. 7, it is observed that the projector 110 is located on the back of the mobile terminal and that the camera 120 is located on the side of the mobile terminal. Consequently, the projector 110 projects a video image in a different direction than the viewing direction of the camera 120, and the camera 120 may not be able to directly sense the projected video image that is reflected back by display surface.

The mobile terminal may include a mirror surface 700 that is movably connected to a housing 710 of the mobile terminal. The mirror surface 700 can be moved between a stored position, where the mirror surface 700 is at least partially recessed within an opening 702 in the housing 710, and an open position where the mirror surface 700 is exposed to an incident portion of the reflected video image from the display surface and configured to reflect the incident portion of the reflected video image to the camera 120 to the camera 120 for sensing.

For example, as shown in FIG. 7, the mirror surface 700 may be slid into and out of the opening 702 along the direction 704, and may be rotated, about a pivot joint on a surface of the opening 702, through a constrained angle to direct the incident portion of the reflected video image into the camera 120. The mirror surface 700 may be spring biased to move along rails within the opening 702 into the open position, and may be returned to the stored position with an opening 702 by a user pressing the mirror surface 700 inwardly into the opening 702 (thereby compressing the spring). When pressed fully into the opening 702, the mirror surface 700 may be releasably retained therein by a latch mechanism.

In the drawings and specification, there have been disclosed exemplary embodiments of the invention. However, many variations and modifications can be made to these embodiments without substantially departing from the principles of the present invention. Accordingly, although specific terms are used, they are used in a generic and descriptive sense only and not for purposes of limitation, the scope of the invention being defined by the following claims.

That which is claimed:

1. An electronic device comprising:
   a video generator configured to generate a video signal;
   a video projector configured to project a video image responsive to the video signal onto a display surface external to the electronic device to cause reflection of the video image;
   a camera configured to sense the reflected video image from the display surface; and a calibration controller configured to adjust brightness and/or color of a subsequent video image that is projected by the video projector to compensate for differences between the video signal and the reflected video image sensed by the camera;
   a housing in which the video projector and the camera are fixedly positioned, wherein the camera is pointed in a sufficiently different direction than the video projector so that the camera cannot sense at least a substantial incident portion of the reflected video image from the display surface; and
   a mirror surface that is movably connected to the housing and is movable between a stored position, where the mirror surface is at least partially recessed within the housing, and an open position where the mirror surface is exposed to an incident portion of the reflected video image from the display surface and reflects the incident portion of the reflected video image to the camera.

2. The electronic device of claim 1, wherein the calibration controller is further configured to adjust color of the subsequent video image that is projected by the video projector to compensate for differences between color of the projected video image and the color of the reflected video image sensed by the camera.

3. The electronic device of claim 2, wherein the calibration controller is further configured to regulate the video generator and/or the video projector to bias the subsequent video signal with a complementary color to a color of the display surface identified in the reflected video image sensed by the camera.

4. The electronic device of claim 1, wherein the calibration controller is further configured to adjust brightness of the subsequent video image that is projected by the video projector in response to brightness of the reflected video image sensed by the camera.

5. The electronic device of claim 1, wherein the calibration controller is further configured to carry out a first calibration process to identify color of the display surface by regulating the video generator and/or the video projector to cause the video projector to sequentially project a plurality of defined calibration color video images on the display surface while the camera senses the reflected video images, and to adjust color of a subsequent video image that is projected by the video projector to compensate for the identified color of the display surface.

6. The electronic device of claim 5, wherein the calibration controller is configured to carry out the first calibration process in response to activation of the video projector, and to subsequently carry out another second calibration process while the video projector is projecting a non-calibration video image stream onto the display surface, the second calibration process including adjusting brightness and/or color of the projected non-calibration video image stream in response to changes in the difference between the projected non-calibration video image stream and the reflected non-calibration video image stream sensed by the camera, and, when the differences between the projected non-calibration video image stream and the reflected non-calibration video image stream sensed by the camera exceed at least one threshold, to temporarily interrupt projection of the non-calibration video image stream while repeating the first calibration process.

7. The electronic device of claim 1, wherein:
   the calibration controller is further configured to identify brightness and/or color of an adjacent surrounding area of the display surface outside an area of the display surface that is reflecting the video image, which is sensed by the camera, and to regulate the video generator and/or the video projector to adjust brightness and/or color of at least a peripheral portion of a subsequently projected video image in response to the identified brightness and/or color of the adjacent surrounding area of the display surface.

8. The electronic device of claim 7, wherein the calibration controller is further configured to identify color of the adjacent surrounding area of the display surface, and to regulate the video generator and/or the video projector to bias color of at least the peripheral portion of the subsequently projected video image with a complementary color to the identified color of the adjacent surrounding area of the display surface.

9. The electronic device of claim 7, wherein the calibration controller is further configured to regulate the video generator and/or the video projector to selectively carry out one of decreasing and increasing brightness of at least the peripheral portion of the subsequently projected video image in response to sensing at least a threshold darkness in the adjacent surrounding area of the display surface, and to selectively carry out the other one of decreasing and increasing brightness of at least the peripheral portion of the subsequently projected video image in response to sensing at least a threshold brightness in the adjacent surrounding area of the display surface.

10. The electronic device of claim 1, wherein the calibration controller is further configured to identify a pattern on the display surface in response to the reflected video image sensed by the camera, and to regulate the video generator and/or the video projector to adjust groups of pixels in a subsequently projected video image so as to at least partially reduce the presence of the display surface pattern in the reflected video image.

11. The electronic device of claim 10, wherein the calibration controller is further configured to regulate the video generator and/or the video projector to bias the color of groups of pixels in the subsequently projected video image with a complementary color to a color of a corresponding area of the display surface pattern on which the groups of pixels in the subsequently projected video image are projected to at least partially reduce the presence of the display surface pattern in the reflected video image.

12. The electronic device of claim 10, wherein the calibration controller is further configured to regulate the video generator and/or the video projector to adjust brightness of groups of pixels in the subsequently projected video image to increase brightness of areas of the projected video image that are projected onto darker areas of the display surface pattern to at least partially reduce the presence of the display surface pattern in the reflected video image.

13. The electronic device of claim 1, wherein the calibration controller is further configured to identify a color pattern on the display surface by regulating the video generator and/or the video projector to sequentially project a plurality of calibration color video images on the display surface and by identifying the color pattern in the corresponding sequence of reflected color video images sensed by the camera, and configured to regulate the video generator and/or the video projector to adjust groups of pixels in a subsequently projected video image so as to at least partially reduce the presence of the identified color pattern in the reflected video image.

14. The electronic device of claim 1, further comprising:
a wireless radio transceiver configured to communicate via RF signals with another electronic device; and
a wireless communication protocol controller configured to carry out wireless communications through the transceiver with another electronic device to receive video data from the other electronic device, and configured to provide the received video data to the video generator to generate the video signal for projection by the projector.

15. The electronic device of claim 14, wherein the wireless communication protocol controller at least partially shares processing circuitry with the calibration controller, and the processing circuitry allocates higher priority processing throughput to the wireless communication protocol controller than to the calibration controller so that the amount of processing throughput available to the calibration controller for determining differences between the video signal and the reflected video image sensed by the camera is automatically reduced as the processing needed by the wireless communication protocol controller increases.

16. The electronic device of claim 15, wherein the wireless communication protocol controller is configured to carry out cellular communications through the transceiver with a cellular base station to receive the video data through the cellular base station, and is further configured to respond to a user selection of incoming received video data for projection by the video projector by carrying out a calibration process to identify color of the display surface by regulating the video generator and/or the video projector to cause the video projector to sequentially project a plurality of defined calibration color video images on the display surface while the camera senses the reflected video images, and to adjust color of a subsequent video image that is projected by the video projector in response to the received video data to compensate for the identified color of the display surface.

17. The electronic device of claim 1, wherein the calibration controller is further configured to cause a visual and/or audible instruction to be generated to a user to move the electronic device within a threshold calibration distance of the display surface which is less than a minimum focus distance of the video projector but which is sufficiently close to enable more accurate determination of color of the display surface, configured to identify color of the display surface by causing the video projector to project at least one defined calibration video image on the display surface while the camera senses color of the display surface, and, following identification of the color of the display surface, is configured to cause a visual and/or audible instruction to be generated to the user to move the electronic device within a focus range of the projector.

18. The electronic device of claim 1, wherein the calibration controller is further configured to identify color of the display surface by causing the camera to take an initial photograph of the display surface before the video image is projected onto the display surface, and to adjust color of the subsequent video image that is projected by the video projector onto the display surface to compensate for the identified color of the display surface.

* * * * *